United States Patent
Suzuki et al.

[15] 3,647,090
[45] Mar. 7, 1972

[54] AUTOMATIC TOOL EXCHANGER

[72] Inventors: Yasuhiro Suzuki, Asa-gun, Hiroshima-ken; Renpei Ikegami, Hiroshima-shi; Takuo Kishimoto, Asa-gun, Hiroshima-ken, all of Japan

[73] Assignee: Mitsubishi Jukogyo Kabushiki Kaisha, Tokyo, Japan

[22] Filed: Mar. 24, 1969

[21] Appl. No.: 809,656

[52] U.S. Cl. .......................................... 214/1 BB, 29/568
[51] Int. Cl. .................................................. B23q 3/157
[58] Field of Search ..................... 217/1 BB, 1 BT; 29/568

[56] References Cited

UNITED STATES PATENTS

| | | | |
|---|---|---|---|
| 1,933,225 | 10/1933 | Smith | 217/1 BE |
| 1,993,754 | 3/1935 | Smith | 214/1 BB |
| 3,256,600 | 6/1966 | Swanson | 29/568 |
| 2,867,058 | 1/1959 | Balsiger | 214/1 BB |
| 3,451,224 | 6/1969 | Colechia | 214/1 CM |

FOREIGN PATENTS OR APPLICATIONS 1,229,454  11/1966  Germany ......................... 214/16.42

Primary Examiner—Gerald M. Forlenza
Assistant Examiner—George F. Abraham
Attorney—McGlew & Tuttle

[57] ABSTRACT

An apparatus for automatically transferring tools between a magazine and a machine tool is arranged to afford movement of a transfer member in three different directions. The tool transfer member is secured to a support frame and is movable in an upward and downward direction. The support frame is movably attached to a carriage which, in turn, is movable along a beam extending between the magazine and the machine tool. The support frame is movable perpendicularly to the vertical plane through which the carriage travels along the beam.

3 Claims, 3 Drawing Figures

INVENTORS
YASUHIRO SUZUKI
RENPEI IKEGAMI
TAKUO KISHIMOTO

BY McGlew and Toren
ATTORNEYS

3,647,090

AUTOMATIC TOOL EXCHANGER

SUMMARY OF THE INVENTION

The present invention is directed to an automatic tool exchanger for machine tools, and, more particularly, it is concerned with a tool transfer member which is capable of movement in three different planes arranged perpendicularly to one another.

In the past, various automatic tool exchangers have been proposed which employ a rotary tool transfer member. Such tool exchangers have a number of disadvantages, for example, disengagement of the tool from the transfer member due to an error in proper alignment during the tool exchange operation, improper holding of the tool, and ejection of the tool from the rotating exchange unit. Moreover, to prevent a tool from striking other tools while it is being inserted or removed from a rotary tool magazine, a sufficiently large forward or backward stroke of the tool change unit with respect to the tool magazine must be available.

Accordingly, a primary object of the present invention is to provide a tool transfer member capable of movement in several different planes to afford an efficient and effective transfer operation and to avoid the disadvantages previously experienced in this art.

Another object of the invention is to provide a pair of independently positionable transfer members for removing and replacing tools in a machine tool.

A further object of the invention is to supply a support arrangement which is simple in construction, and one which affords all of the requisite movements necessary for the transfer of tools between a rotatable tool magazine and a machine tool.

Therefore, in accordance with the present invention, an automatic tool exchanger is provided which is capable of linear movements in three different directions or planes of operation of the apparatus. In transferring the tools between the machine tool and the magazine a pair of transfer members are provided each movable in an upward and a downward direction. In turn these transfer members are mounted on a support frame which is movable in a direction at right angles to the upward and downward movement of the transfer members for positioning the transfer members toward and away from both the machine tool and the magazine. Further, the support frame is mounted on a carriage which in turn is movably supported on a guide beam for moving the tool exchanger between the machine tool and the magazine. The movement of the carriage along the beam is at right angles to the inward and outward movement of the support member. Preferably, the movement of the tool transfer members and of the support frame is effected by hydraulic cylinder means while the carriage is positioned along the beam by means of a driven pinion mounted on the carriage in engagement with a rack affixed to the beam.

In operation, one of the transfer members is arranged to remove a tool from the machine tool while the other one carries a tool to be inserted into the machine tool. Subsequently, the tool removed from the machine tool is transported to the magazine and is placed within the proper socket. The next tool to be used is removed from the magazine and then the transfer members are repositioned for the subsequent tool replacement operation.

The various features of novelty which characterize the invention are pointed out with particularlity in the claims annexed to and forming a part of this specification. For a better understanding of the invention, its operating advantages should be had to the accompanying drawings and descriptive matter in which there is illustrated and described a preferred embodiment of the invention.

DETAILED DESCRIPTION OF THE PREFERRED EMBODIMENT

Figure 1:
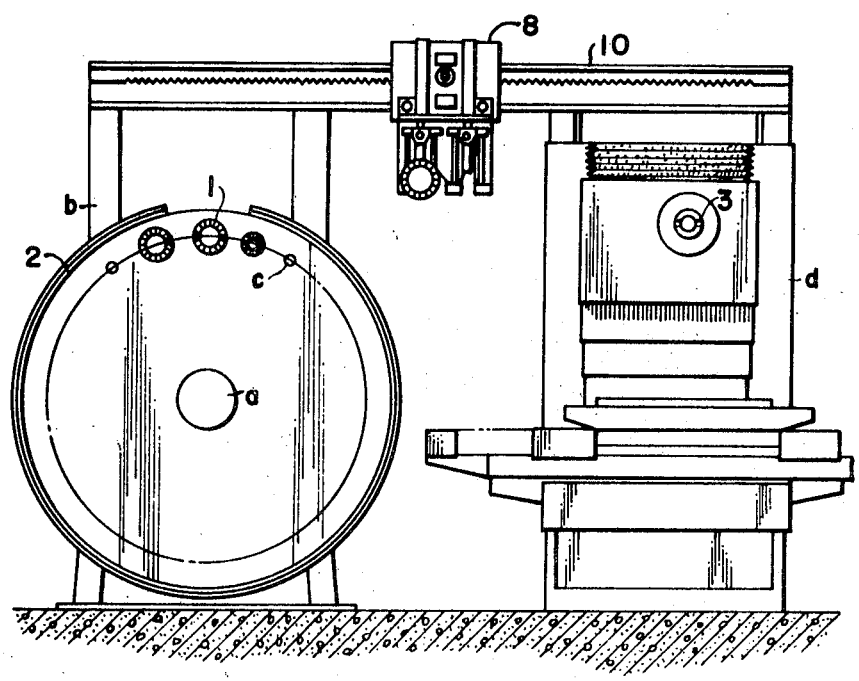
FIG. 1 is a front view of an automatic tool exchanger, in accordance with the invention, for transferring tools between a magazine and a machine tool.

In FIG. 1 a tool magazine 2 is rotatable about its shaft $a$ which is supported within a frame $b$. A plurality of sockets $c$ are disposed in angularly spaced relationship on a circle concentric with the shaft $a$ and located closely inward from the periphery of the tool magazine 2. The sockets are arranged to receive holders 1, 1', 1'' for tools.

Spaced laterally from the magazine 2 is a machine tool $d$ having a main spindle 3 arranged to receive individual tools. The end face of the main spindle 3 lies substantially in the same vertical plane as the face of magazine 2 containing the tools. Located above and extending between the magazine and the machine tool is a horizontally arranged guide beam 10 which supports a carriage 8 for transferring the tools between the magazine and the machine tool.

Figure 2:
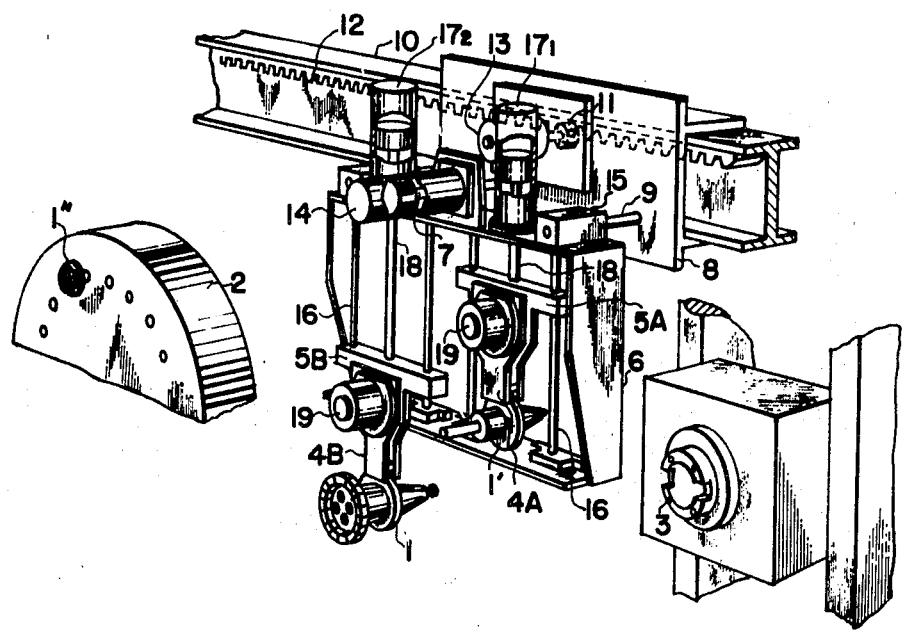
FIG. 2 is a perspective view of the automatic tool exchanger of FIG. 1 in position for replacing a tool in the machine tool.

In its movement between the machine tool $d$ and the magazine 2 the carriage travels in a horizontal direction through a vertical plane which is in parallel relationship with the vertical plane including the face of the magazine containing the tool holders 1. Mounted on the carriage, as shown in FIG. 2, is a motor 13, such as an oil pressure motor, with a pinion 11 on the end of its drive shaft arranged in engagement with a toothed rack 12 affixed to the guide beam 10. As the motor 13 drives the pinion 11, the carriage 8 will move horizontally along the beam 10 in the desired direction for transferring tools between the magazine and the machine tool.

Extending laterally from the carriage are two spaced, horizontally arranged guide rods 9 disposed perpendicularly to the vertical plane of the carriage. At their ends remote from the carriage 8 the guide rods 9 are slidably positioned within bearings 15 located on the top of a support frame 6. The support frame 6 is mounted on the carriage 8 by means of the guide rods and can be displaced laterally toward and away from the vertical plane of the carriage 8. To position the support frame 6 relative to the carriage 8 a hydraulic cylinder assembly 14 is mounted on top the support frame 6 and its piston rod 7 extends into engagement with the carriage 8. The hydraulic cylinder assembly is positioned between and in parallel relationship with the guide rods 9. By displacing the piston rod 7 within the cylinder 14 the frame 6 can be made to slide on the guide rods 9 both toward and away from the carriage 8.

Mounted within the support frame 6 are a pair of tool transfer members 5A, 5B, arranged for movement in the vertical or upward and downward direction, and two pairs of vertically arranged horizontally spaced guide rods 16. Each of the tool transfer members 5A, 5B is arranged to slide in the vertical direction supported along its opposite sides by the guide rods 16. Located at the upper end of the support frame 6 are two hydraulic cylinders $17_1$, $17_2$ to effect the upward and downward movement of the tool transfer members. The hydraulic cylinders $17_1$, $17_2$ are aligned centrally above the tool transfer members 5A, 5B respectively. Each of the hydraulic cylinders $17_1$, $17_2$ has a piston rod 18 which extends downwardly and is connected to the upper portion of the associated tool transfer member. In response to the movement of the piston rods 18 within the hydraulic cylinders $17_1$, $17_2$ the transfer members are directed upwardly and downwardly along the guide rods 16.

Figure 3:
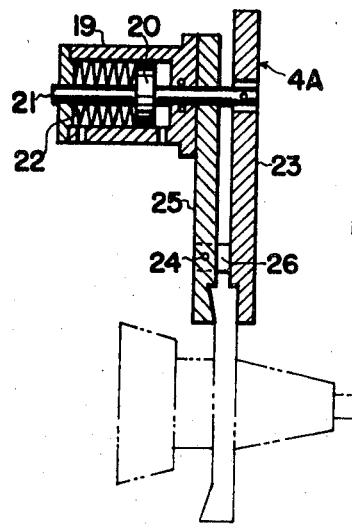
FIG. 3 is a partial sectional view of the tool transfer member, as shown in FIG. 2, which holds the tool during the transfer operation.

Each of the tool transfer members 5A, 5B is equipped with a gripping element 4A, 4B, respectively. The gripping elements, as can be noted in FIG. 2, extend downwardly from the transfer members. In FIG. 3, the arrangements of the gripping elements 4A, 4B are shown as comprised of a horizontally arranged hydraulic cylinder 19 which is secured to the upper end of a grip rod 25. A second grip rod 23 is positioned in closely spaced relationship from the grip rod 25 and a piston rod 21 extends from the hydraulic cylinder 19 through the grip rod 25 and is pivotally attached to the grip rod 23. At the lower ends of the grip rods a crossmember 26 is attached to the grip rod 23 and is secured to the grip rod 25 by means of a pin 24. A piston 20 is mounted on the piston rod 21 within the hydraulic cylinder 19 and a number of disc springs 22 are disposed concentrically about the piston rod 21 within the cylinder being spaced between the piston rod 20 and the end of the cylinder remote from the grip rod 25. When oil pressure is supplied into the cylinder 19 against the piston 20 causing the compression of the disc springs 22, the piston rod 21 is retracted into the cylinder and causes the upper end of the grip rod 23 to move toward the grip rod 25. Since the lower end of the grip rod 25 is pin connected through the crossmember 26 to the grip rod 23 the retraction of the piston rod 21 causes the lower ends of the grip rods to be forced apart. Conversely, when the hydraulic fluid pressure is relieved from the surface of the piston opposite the disc springs, the springs tend to restore the piston to its original position forcing the piston rod outwardly and causing the grip rods 23 and 25 to be restored to their original gripping position. In FIG. 3, the grip rods 23, 25 are shown in the gripping position with a tool holder, shown in phantom, being held by the gripping element 4A.

In transferring tools between the magazine 1 and the machine tool d the tool exchanger operates in the following manner:

1. At the outset of the tool replacement operation, the tool to be inserted into the machine tool d held by the tool holder 1 within the gripping element 4B and the tool and its holder 1' located within the spindle 3 is to be removed by the tool transfer member 5A.

2. With the gripping element 4B holding the tool holder 1 in position above the main spindle 3 of the machine tool d the tool transfer member 5A is moved downwardly by means of the hydraulic cylinder 17$_1$ and its piston rod 18 until the gripping element 4A engages the tool holder 1' located within the main spindle 3. Next, the tool holder 1' is released from its locked engagement within the main spindle by loosening a fastening means, not shown.

3. By means of the hydraulic cylinder 14 and its piston rod 7 the support frame 6 is moved outwardly on the guide rods 9 away from the machine tool d for a distance sufficient to remove the tool holder 1' from the main spindle.

4. The hydraulic cylinder 17$_1$ is operated to retract its piston rod 18 thereby lifting the transfer member 5A and the tool holder 1' secured within its gripping element 4A above the main spindle 3. At the same time the piston 18 within the hydraulic cylinder 17$_2$ is extended downwardly to position it for insertion of the tool holder 1 into the main spindle 3. By moving the carriage 8 along the guide beam 10 the transfer member 5B is moved to the right, as viewed in FIG. 2, until the tool holder 1 held by the gripping element 4B is aligned in front of the main spindle 3.

5. The support frame 6 is then drawn inwardly by means of the piston rod 7 within the hydraulic cylinder 14 toward the carriage 8 until the tool holder 1 is inserted within the main spindle 3 and is secured in place by the fastening means mentioned above.

6. In the gripping element 4B by drawing the piston rod 21 inwardly into the hydraulic cylinder 19 the grip rods 25 and 23 are separated and the tool holder 1 is released.

7. After the release of the tool holder 1 the tool transfer member 5B is drawn upwardly by means of the hydraulic cylinder 17$_2$ and the carriage is moved to the left as viewed in FIG. 2, by means of the drive motor 13 and its pinion 11 in engagement with the rack 12 on the guide beam 10. The leftward movement of the transfer member 5B continues until its gripping element 4B is in position to engage the tool holder 1'' which contains the next tool to be placed into the machine tool.

8. With the tool transfer member 5B aligned above the socket c containing the tool holder 1'' in the magazine the transfer member 5B is lowered to effect the engagement of the gripping element 4B with the tool holder 1''.

9. The gripping element 4B is actuated to engage the tool holder 1''.

10. With the tool holder 1'' held by the transfer member 5B the support frame 6 is moved outwardly from the magazine a sufficient distance to withdraw the tool holder 1'' from its socket.

11. Next, the transfer member 5B is moved upwardly by the hydraulic cylinder 17$_2$ and is held in position for subsequent insertion into the main spindle 3.

12. The tool magazine is rotated to position one of the sockets c to receive the tool holder 1' which has been removed from the main spindle in the previous operation.

13. With the transfer member 5B in its upwardly retracted position the carriage 8 is moved further to the left to position the transfer member 5A above the socket selected to receive the tool holder 1'.

14. The piston rod 18 within the hydraulic cylinder 17$_1$ is extended causing the transfer member 5A to ride downwardly on the guide rods 16 until the tool holder 1' is aligned in front of the proper socket in the tool magazine 2.

15. By means of the piston rod 7 within the cylinder 14 the support frame 6 is moved inwardly on the guide rods 9 toward the carriage 8 until the tool holder 1' is inserted into position within the socket in the tool magazine.

16. After properly seating the tool holder 1' within its socket the gripping element 4A is released from the tool holder and the transfer member is retracted upwardly to a position located above the horizontal plane containing the main spindle 3. The support frame 6 is again retracted toward the carriage 8 and the carriage is moved to the right along the beam 10 into a selected position preparatory to the next tool transfer operation.

As described in the above steps, the tool exchanger is capable of separate independent movements in three different perpendicularly arranged planes for transferring the tool holders between the tool magazine and the main spindle of the machine tool. As viewed in FIG. 2, the carriage and its support frame is movable in the horizontal direction for locating the transfer members 5A, 5B in position in front of the tool magazine and the machine tool. Further, after properly positioning the carriage and the support frame, the support frame is movable inwardly and outwardly relative to the carriage for displacement toward and away from the magazine and the machine tool in the steps of inserting and withdrawing the tool holders from the socket c and the main spindle 3, respectively. The third independent movement provided by the device is the upward and downward movement afforded the transfer members 5A, 5B, by the hydraulic cylinders 17$_1$, 17$_2$ and their piston rods 18. By coordinating these three separate linear movements the transfer of tools between the magazine and the machine tool can be performed in an exact and efficient manner and the disadvantages previously experienced in conventional automatic tool exchangers can be avoided thereby providing a safe and efficient transfer operation.

What is claimed is:

1. An automatic tool exchanger, for transferring tools between a tool magazine and a machine tool, comprising, in combination, a guide beam extending substantially horizontally between the tool magazine and the machine tool; a carriage; means mounting said carriage on said guide beam for movement only longitudinally of said guide beam; first means operable to move said carriage along said guide beam between the tool magazine and the machine tool; a support frame; means mounting said support frame on said carriage for movement only horizontally relative to said carriage and only perpendicular to the direction of movement of said carriage; second means operatively engaged with said support frame and said carriage and operable to move said support frame horizontally relative to said carriage in a direction perpendicular to the vertical plane of movement of said carriage along said beam; two tool transfer members; means mounting said transfer members on said support frame in side-by-side relation with each other for movement only vertically in a direction perpendicular to the direction of travel of said carriage along said beam and only in a plane parallel to the vertical plane of movement of said carriage along said beam; third means operatively engaged with said tool transfer members and with said support frame and operable to effect independent vertical movement of said tool transfer members relative to said frame; and respective tool gripping means on each tool transfer member operable to grip and support a tool with an orientation perpendicular to the vertical plane of movement of said carriage along said beam; said tool gripping means comprising a pair of relatively elongated tool gripping rods disposed in spaced, substantially parallel relation and having corresponding one ends formed to grip a tool; a bar pivotally interconnecting said grip rods adjacent said one ends thereof and inwardly of the tool gripping portions at said one ends; and a hydraulic actuator coupled to said rods at the opposite ends thereof; said hydraulic actuator comprising a hydraulic cylinder secured to the outer surface of one rod, a piston in said cylinder, and a piston rod extending from said cylinder through said one rod and having its outer end connected to the other rod; said hydraulic actuator being operable to open and close said one end of said grip rods to release and to clamp a tool.

2. An automatic tool exchanger, as set forth in claim 1, including spring means in said hydraulic cylinder engaged with said piston and biasing said piston rod outwardly to move said grip rods to the tool-gripping position, whereby, after said piston has been subjected to hydraulic pressure to retract said piston rod to cause said grip rods to release a tool, said spring means, upon release of the hydraulic pressure, returning said grip rods to the tool-gripping position.

3. An automatic tool exchanger, for transferring tools between a tool magazine and a machine tool, comprising, in combination, a guide beam extending substantially horizontally between the tool magazine and the machine tool; a carriage; means mounting said carriage on said guide beam for movement only longitudinally of said guide beam; first means operable to move said carriage along said guide beam between the tool magazine and the machine tool; a support frame; means mounting said support frame on said carriage for movement only horizontally relative to said carriage and only perpendicular to the direction of movement of said carriage; second means operatively engaged with said support frame and said carriage and operable to move said support frame horizontally relative to said carriage in a direction perpendicular to the vertical plane of movement of said carriage along said beam; two tool transfer members; means mounting said transfer members on said support frame in side-by-side relation with each other for movement only vertically in a direction perpendicular to the direction of travel of said carriage along said beam and only in a plane parallel to the vertical plane of movement of said carriage along said beam; third means operatively engaged with said tool transfer members and with said support frame and operable to effect independent vertical movement of said tool transfer members relative to said frame; and respective tool gripping means on each tool transfer member operable to grip and support a tool with an orientation perpendicular to the vertical plane of movement of said carriage along said beam; said support frame including top and bottom walls interconnected by sidewalls; said means mounting said transfer members in said support frame comprising respective pairs of horizontally spaced vertical guide rods extending between said top and bottom walls of said transfer member; said tool transfer members being slidably mounted on said guide rods; the piston rod of each hydraulic actuator being vertically oriented and positioned between the associated pair of guide bars.

* * * * *